United States Patent
Braine

(10) Patent No.: US 12,260,884 B2
(45) Date of Patent: Mar. 25, 2025

(54) TONEARM PIVOT

(71) Applicant: Richard Braine, London (GB)

(72) Inventor: Richard Braine, London (GB)

( * ) Notice: Subject to any disclaimer, the term of this patent is extended or adjusted under 35 U.S.C. 154(b) by 5 days.

(21) Appl. No.: 18/021,873

(22) PCT Filed: Aug. 18, 2021

(86) PCT No.: PCT/GB2021/052142
§ 371 (c)(1),
(2) Date: Feb. 17, 2023

(87) PCT Pub. No.: WO2022/038355
PCT Pub. Date: Feb. 24, 2022

(65) Prior Publication Data
US 2023/0360670 A1    Nov. 9, 2023

(30) Foreign Application Priority Data

Aug. 18, 2020 (GB) .................................... 2012912

(51) Int. Cl.
*G11B 3/14* (2006.01)
*G11B 3/12* (2006.01)

(52) U.S. Cl.
CPC .............. *G11B 3/145* (2013.01); *G11B 3/121* (2013.01)

(58) Field of Classification Search
None
See application file for complete search history.

(56) References Cited

U.S. PATENT DOCUMENTS

| | | | | | |
|---|---|---|---|---|---|
| 3,957,272 | A | * | 5/1976 | Yasuda | G11B 3/10 369/256 |
| 3,963,246 | A | * | 6/1976 | Trochimowski | G11B 3/12 369/255 |
| 4,114,895 | A | * | 9/1978 | Eckhart | G11B 3/20 |

(Continued)

FOREIGN PATENT DOCUMENTS

| | | |
|---|---|---|
| JP | S52157804 U | 11/1977 |
| JP | S5625316 U | 3/1981 |

OTHER PUBLICATIONS

Translation of JP S52-157804U, published Nov. 30, 1977 (Year: 1977).*

(Continued)

*Primary Examiner* — William J Klimowicz
(74) *Attorney, Agent, or Firm* — MARSHALL, GERSTEIN & BORUN LLP

(57) ABSTRACT

A tonearm including an elongate member, a suspension means, a protrusion and a contact surface. The suspension means suspends the elongate member (8*a*; 8*b*; 8*c*; 8*d*; 8*e*) in an approximately horizontal position. The weight of the elongate member is substantially supported by the suspension means. The protrusion is arranged in opposing contact with the contact surface at a contact point, such that action of a drag force substantially parallel to the length of the elongate member urges the contact surface and the protrusion into opposing contact, thereby producing a contact force which resists the drag force. By separating the means for supporting the weight of the elongate member and the means for resisting a drag force acting along the length of the elongate member, the drag force can be more effectively resisted thus providing a tonearm with improved properties.

31 Claims, 11 Drawing Sheets

(56) References Cited

U.S. PATENT DOCUMENTS

| | | | |
|---|---|---|---|
| 4,149,730 A | 4/1979 | Bois et al. | |
| 4,170,360 A * | 10/1979 | Ohsawa | G11B 3/125 |
| | | | 369/233 |
| 4,570,253 A * | 2/1986 | Firebaugh | G11B 3/18 |
| 7,086,071 B2 * | 8/2006 | Schroder | G11B 3/125 |
| | | | 720/683 |

OTHER PUBLICATIONS

Search Report Under Section 17(5), United Kingdom Application No. 2012912.8, dated Jan. 22, 2021.
International Search Report and Written Opinion, International Application No. PCT/GB2021/052142, dated Nov. 22, 2021.

* cited by examiner

TONEARM PIVOT

BACKGROUND OF THE INVENTION

This invention relates to a bearing for a tonearm of a phonograph or gramophone turntable or record player.

Phonograph records, also known as gramophone records or vinyl records, are an analogue sound medium comprising a flat disc engraved with a modulated spiral groove. The groove channel typically has two side walls, arranged mutually perpendicular to one another, so as to provide two channels for producing stereophonic sound. A turntable is a device used to read the signal encoded on a phonograph record so that the recorded sound can be reproduced.

A turntable includes a rotating platter, on which a phonograph record can be placed, and a tonearm which is movable relative to the platter, and a cartridge which is mounted to one end of the tonearm. The cartridge contains two coils, arranged perpendicular to the two walls of the record groove. A stylus or cantilever protrudes from the cartridge and contacts the groove of the record. The stylus contains two magnets, each arranged to move with respect to the corresponding coil as a result of distortions or modulations on the walls of the groove. The relative movement of each magnet-coil pair produces a small voltage which can then be further processed (including amplification) and supplied to respective speakers to produce sound as encoded by the phonograph record.

The role of the tonearm of the turntable is to allow the cartridge to be placed in the correct position relative to the phonograph record, and to maintain the correct position of the cartridge as the record is played, in order to facilitate audio pickup. It is accepted within the field that a tonearm produces an audible signature within the produced audio signal, i.e. the tonearm influences the signal picked up from the record such that different tonearms can result in a different sound from the same phonograph record. For context, a 20 kHz signal at the end of a typical LP phonograph record is stamped at a scale of one full oscillation per hundredth of a millimetre. An accurate tonearm needs to obstruct movement of the cartridge along the groove on that scale or less.

There are a number of known pivot arrangements which are designed with the intention to allow movement of the tonearm in desired directions, whilst preventing the undesirable motion of the tonearm which affects sound quality.

One known arrangement is to use ball-race or gimbal bearings. Such arrangements involve several points of contact in order to fasten the tonearm to its base and thereby obstruct movement in the direction in which the record drags the stylus. However, these multiple points of contact may "chatter" i.e. rattle on a microscopic scale if thermal expansion, wear, or tolerances cause gaps between the bearing parts, resulting in distortion of the produced sound signal. Such an arrangement also requires high quality low tolerance bearings in order to minimise this chatter, and is therefore undesirable.

An alternative known arrangement is known as a vertical 'unipivot'. Put simply, such an arrangement is essentially a cup balanced in an inverted (i.e. upside down) position on a sharp point or spike. The weight of the tonearm creates a downward force at the contact point, which results in some friction, resisting the motion of the tonearm as the tonearm is "dragged" by the record pulling on the stylus. As a result of this friction between the spike and the cup, the sharp point will become blunter and more polished with use. This may allow some freedom to move in the direction of stylus drag as the drag force oscillates. This is likely to contribute to the audible signature of the tonearm.

A third known alternative is known as a 'linear' tracker, the base of which slides or glides along a support which is parallel to the line from stylus to record centre. However, such arrangements allow microscopic movement of the tonearm in the direction of the stylus drag as they need 'play' to move freely along the support. Again this is likely to add an undesirable audible signature to the signal.

It is desirable to provide an improved tonearm arrangement, which addresses some of the shortcomings of these known solutions.

SUMMARY OF THE INVENTION

From a first aspect, the invention provides a tonearm comprising:
  an elongate member;
  a suspension means suspending the elongate member in an approximately horizontal position, wherein the weight of the elongate member is substantially supported by the suspension means;
  a protrusion; and
  a contact surface,
  wherein the protrusion is arranged in opposing contact with the contact surface at a contact point, such that action of a drag force substantially parallel to the length of the elongate member urges the contact surface and the protrusion into opposing contact, thereby producing a contact force which resists the drag force.

Thus it will be seen that, in accordance with the invention, by separating the means for supporting the weight of the elongate member and the means for resisting a drag force acting along the length of the elongate member, the drag force can be more effectively resisted thus providing a tonearm with improved properties. The improved resistance to drag force allows the tonearm according to the present invention to produce sound from a phonograph record which has improved quality compared to known tonearm arrangements. The improved quality takes the form of a reduced audible signature due to the tonearm so that the original sound defined by the phonograph record is more accurately reproduced. The arrangement of the protrusion and the contact surface ideally does not support any (or any substantial portion) of the weight of the elongate member, and can therefore be more optimally arranged for the purpose of resisting the drag force which acts parallel to the length of the elongate member. Moreover, only a single point of contact between the protrusion and the contact surface is required in order to produce the contact force which resists the drag force. The presence of only a single contact point makes the tonearm of the present invention less susceptible to chatter.

As is described below with reference to FIG. 1, movement of a record under a stylus attached to a tonearm may apply a pulling force on the tonearm which acts along a direction which is at an angle to the length of the tonearm. Thus "the drag force" acting along the length of the elongate member may be a component of a total drag force acting on the tonearm. The component of the total drag force that acts perpendicular to the length of the tonearm acts to pull the tonearm (and thus the stylus) towards the centre of the record and is known as the skate force. An anti-skate force is normally applied to counteract (or substantially counter-act) the skate force so that the resultant force (of the total drag force and the anti-skate force) is essentially the component of drag force along the length of the tonearm. As the perpendicular component of the drag force is balanced by the anti-skate force, references here to the drag force acting on the tonearm should be taken to be the component of the drag force that acts along the length of the tonearm, unless specified to the contrary.

It will be understood by the skilled person that the statement that action of a drag force substantially parallel to the length of the elongate member "urges the contact surface and the protrusion into opposing contact" does not preclude the contact surface and the protrusion from already having been arranged in contact before the application of such a force e.g. the contact surface and protrusion may have been in contact prior to being "urged into contact", but need not have already been in contact. Rather the statement that they are "urged into contact" describes that the force acts in a direction such as to move the contact surface and the protrusion mutually towards each other, rather than, for example, driving them away from each other. In some examples, the protrusion and contact surface may be arranged to be in contact prior to the application of drag force, so that they are urged by the drag force to maintain opposing contact, increasing the pressure between the contact surface and the protrusion at their point of contact.

It will be appreciated that since the suspension means bears the weight of the elongate member, the protrusion together with the contact surface are required to resist only the drag force, which is substantially parallel to the length axis of the elongate member i.e. approximately horizontal. Thus the contact force i.e. the total resultant force produced at the contact point, may be substantially horizontal.

It will be understood that the contact force produced is the total resultant force, at the contact point. It will further be understood that a suspension means suspending the elongate member is a means which supports the weight of the elongate member e.g. from a point which is at a greater height than the height at which the suspension means is connected to the elongate member (either directly or indirectly), i.e. not necessarily directly above, on the same vertical axis, but comparatively vertically higher up. The contact force produced resists movement of the tonearm in the direction in which the force parallel to the length of the elongate member (e.g. the drag force) pulls the tonearm.

In some embodiments the contact surface is arranged substantially perpendicular to the length axis of the elongate member. It will be understood by the skilled person that "substantially perpendicular" does not require an angle of exactly 90°, or even very close to 90°. According to the present disclosure, the contact surface need only be perpendicular to the extent required in order that the contact force produced at the contact point is able to resist a drag force applied, preferably without producing significant movement of the protrusion relative to the contact surface. In some examples, the contact surface may be at an angle of at least 60° to the length axis of the elongate member, optionally at least 70°, further optionally at least 80°, further optionally at least 85°. The relative angle may refer to an angle of rotation about any axis perpendicular to the horizontal axis defined by the length of the elongate member. The arrangement of the contact surface substantially perpendicular to the length axis of the elongate member ensures that the contact surface is also substantially perpendicular to the direction of a force applied along this axis, so that the opposing contact force, which is also substantially parallel to this axis, is approximately normal to the contact surface, thus allowing the contact surface to effectively resist this force. In other words, the angle between the normal to the contact surface and the axis of maximum drag force is small enough to maintain stiction. This angle could be up to 30 degrees or more, depending on the nature of the contact point and the contact surface.

It will furthermore be understood by the skilled person that the reference to the "contact surface" being "substantially perpendicular" to the length axis refers specifically to the part of the contact surface at the contact point. Outside this specific region the surface which comprises the contact surface may have any suitable shape e.g. be curved or sloped or flat. In some embodiments, the contact surface is substantially rigid or incompressible e.g. not deformable, so as not to allow relative movement due to the force.

In some embodiments, the protrusion defines a protrusion axis, about which the protrusion is approximately rotationally symmetric, wherein the protrusion axis is substantially parallel to the length axis of the elongate member. This reduces the need for the protrusion to provide a sharp point, since the force is applied directly along the axis of the protrusion. In some embodiments, the protrusion is substantially rigid or incompressible e.g. not deformable, so as not to allow relative movement due to the force.

In some embodiments the protrusion is a conical protrusion. In some embodiments, the protrusion defines a point, forming a pivot point for the contact surface.

In some embodiments, the contact surface is attached to the elongate member. Alternatively, in other embodiments, the protrusion is attached to the elongate member. It will be understood herein that instances of the term "attached" do not require that a particular component be attached directly to another component, but rather allow the possibility that they are connected by other intermediate components. "Attached" does require there to be some permanent or semi-permanent fixing in the contact of the components, and does not describe a situation of merely adjacent contact.

In some embodiments, the tonearm comprises a substantially flat plate, which comprises the contact surface. A flat plate is highly effective and very cost effective to produce. It will be appreciated that in other embodiments, the tonearm could comprise a cup, which in turn comprises the contact surface. For example, the inner surface of the cup i.e. the concave surface, could comprise the contact surface. In practice, the shape of the contact surface, outside of the contact point itself has little impact on the contact force as the protrusion does not slip during use. Therefore the region outside of the contact point is not important. In some embodiments, the tonearm further comprises a contact surface support member, to which the contact surface is attached.

In some embodiments, the tonearm further comprises a rigid connection member, wherein the rigid connection member is attached to the elongate member, and wherein the suspension means comprises at least one suspension member, connected to the rigid connection member at a first connection point.

It will be understood by the skilled person that such a rigid connection member is not substantially bendable or deformable, e.g. it is incompressible. Such a rigid connection member advantageously can provide a suitable component to which to connect at least one suspension member in order to suspend the weight of the elongate member.

In some embodiments the rigid connection member extends in the vertical direction from an underside of the elongate member. The skilled person will understand the vertical direction to be defined relative to the substantially horizontal direction of the elongate member. In some embodiments the rigid connection member provides the contact surface. In other embodiments the rigid connection member comprises the protrusion. This advantageously provides an arrangement in which the contact point (at which the contact force is produced) can be below the level of a stylus (which is attached to a distal end of the elongate member when the tonearm is in use). The positioning of the contact point below the level of a stylus causes the horizontal drag force to produce a torque about a horizontal axis passing through the contact point (the pitch axis) and thereby to provide an increase in downforce at the distal end (or stylus end) of the elongate member, which helps to maintain contact of the stylus with the record (in use).

In some embodiments the tonearm further comprises a support member, wherein the at least one suspension member is connected to the support member. The support member may be connected to any suitable structure e.g. a base plate of a phonograph record player, or a table, in order to provide a structure which allows the suspension means to support the weight of the elongate member. In some embodiments, the support member comprises the protrusion.

In some embodiments the support member is a substantially vertical elongate member. Optionally, the support member may be arranged to pass through an opening in the elongate member, and the at least one suspension member may be connected to the support member at a point above the elongate member. This helps to provide a stable connection point, above the elongate member, whilst also remaining compact. Alternatively, the at least one suspension member may be connected to the support member at a point below the elongate member. This allows the support member to be located entirely below the elongate member, so as not to occupy any additional space, and so as not to obscure a view of the elongate member. It will be appreciated that the shape of the support member can be varied a great deal while still providing the function of providing a suitable point from which to suspend the elongate member. In some embodiments, the support member may be a substantially L-shaped or U-shaped member, comprising at least a first arm and a second arm attached together and approximately at right angles relative to each other, wherein the first arm is arranged substantially vertically, and wherein the second arm is arranged approximately horizontally, extending above the elongate arm, wherein the suspension member is attached to the second arm. A U-shaped member may further comprise a third arm, arranged substantially vertically and attached to the other end of the second arm at right angles (the end of the second arm which is not attached to the first arm).

In some embodiments, the first connection point (at which the at least one suspension member connects to the rigid connection member) is offset along an axis parallel to the length of the elongate member, relative to a suspension point at which the at least one suspension member is connected to the support member, such that the first connection point is further towards a proximal end of the elongate member, and the suspension point on the support member is closer to a distal end (e.g. the end where the stylus would be attached) of the elongate member, relative to one another. In some embodiments the tonearm further comprises an offset member, which pushes the rigid connection member in order to create this offset. The protrusion may act to create this offset. This offset acts so as to urge the support member and rigid connection member, which in some examples comprise the protrusion and the contact surface, into opposing contact.

In other words, this arrangement tilts the at least one suspension member slightly from the vertical direction, i.e. pushes the rigid connection member out of the equilibrium position in which the suspension member hangs vertically downwards, so that the at least one suspension member pulls the contact surface and the protrusion into contact, as they try to return to the equilibrium position. This force therefore acts to urge the contact surface and the protrusion together so that contact (possibly only light contact) is generally maintained even in the absence of a "drag" force acting parallel to the length of the elongate member. In some embodiments, the protrusion and the contact surface are attracted to each other by a magnetic force. Thus, in other words, there is a magnetic attraction between the protrusion and the contact surface (e.g. the pivot-point and a thrust-plate). This could be achieved by any suitable arrangement. For example, both the contact surface and the protrusion could be made of ferromagnetic material (e.g. iron, cobalt, nickel) (or made of a material containing a ferromagnetic material e.g. stainless steel), at least one of them being a permanent magnet. Alternatively, the tonearm may further comprise at least one additional magnet, attached to either the protrusion or the contact surface, in order to create the magnetic force. This may be used in addition, or alternatively, to the offset connection point described above, so that contact (possibly only light contact) is generally maintained even in the absence of a "drag" force acting parallel to the length of the elongate member.

In some embodiments, the at least one suspension member is connected to the rigid connection member at the first connection point and at a second connection point. The arrangement of two spaced apart connection points (the first and second connection points) helps to restrict "rolling" movement of the elongate member e.g. the ability of the elongate member to rotate about its own longitudinal axis, which is undesirable. In some embodiments, the first connection point and the second connection point are at the same vertical height (at least when the rigid connection member is in the standard operating position, which is a neutral position in which no "rolling" forces are acting to create rotation of the elongate member and therefore of the rigid connection member).

In some embodiments, the first connection point and the second connection point are each at approximately the same vertical height as the contact point. This advantageously creates a horizontal line of three points, about which the elongate member is able to rotate (thus providing an axis for "pitch" rotation) e.g. the "up" and "down" motion created as a result of a stylus connected to the elongate member going over a warp in a record). This helps to prevent the protrusion from rubbing against the contact surface as the distal end of the tonearm (the cartridge end) moves up and down. The first connection point and the second connection point define the pitch axis about which the elongate member rotates during a pitching movement. Therefore, when the contact point (between the protrusion and the contact surface) also lies on this line, the protrusion will simply rotate on the pitch axis without any friction being induced.

In some embodiments, the at least one suspension member comprises a flexible member. The at least one suspension member may be flexible along its entire length, or only along certain portions of its length. In some embodiments, the at least one suspension member may comprise at least one rigid portion, and at least one flexible portion. The suspension member may comprise a first flexible portion, at the first connection point, a second flexible portion, at the second connection point, and a third flexible portion, at the suspension point at which the suspension member connects to the support member. Alternatively, the at least one suspension member may comprise a rigid frame structure with flexible attachments connecting the frame structure to the support member and to the first and second connection points. The presence of a rigid portion within the suspension member helps to reduce the risk of resonance in the suspension member. The flexible portions at the first and second connection points allow pitching of the elongate member about a pitch axis through the first and second connection points (and preferably also the pivot point).

A single suspension member may be used to support the elongate member at a single connection point. However, as discussed above, stability can be improved by providing two suspension members to separate connection points on the elongate member (e.g. on the rigid connection member). Therefore, in some embodiments, the at least one suspension member comprises two suspension members, wherein a first suspension member is connected to the first connection point of the rigid connection member and a first suspension point, wherein the first suspension point is a connection point of the support member, and wherein a second suspension member is connected to the second connection point of the rigid connection member and a second suspension point, wherein the second suspension point is a connection point of the support member. The first suspension point and the second suspension point may be separated by a small distance, but any such separation introduces a small torque about the vertical (yaw) axis as the elongate member progresses across the record. Such torque is undesirable and therefore in some embodiments the first suspension point and the second suspension point are the same, i.e. both the first suspension member and the second suspension member are attached to the same suspension point.

In other embodiments, the at least one suspension member is a single suspension member, having a first end and a second end, wherein the first end is connected to the first connection point and wherein the second end is connected to the second connection point, and wherein the suspension member is fixedly connected to the support member at a point along the length of the suspension member, between the first end and the second end. Optionally the suspension member is connected to the support member at a point along the length of the suspension member which is equidistant between the first end and the second end of the suspension member.

Having either a single suspension member, connected to the support member at a single point, or two separate suspension members, each connected to the same point on the support member, advantageously defines a pivot axis, extending vertically through the suspension point on the support member, about which the elongate member is able to rotate easily. This allows rotation of the elongate member in the "yaw" direction without extraneous forces being produced which hinder this movement.

In some embodiments, the support member further comprises a small rotating joint or bearing at the first suspension point (or, where a second suspension point is provided, both suspension points could be provided on the rotating joint or bearing). Such a joint or bearing could substitute for or supplement the suspension member at this point, to obviate torque (i.e. to prevent torque building up as the elongate member rotates around the yaw axis as it progresses across the record). In some such embodiments, the central axis of the joint or bearing passes directly through the contact point, thus maintaining the yaw axis. The rotating joint or bearing may in some embodiments comprise a ball race.

In some embodiments, the elongate member defines a proximal end and a distal end, wherein the tonearm further comprises:

a cartridge comprising a stylus, connected to the distal end; and a counterweight connected to the proximal end.

As described above, in some embodiments the rigid connection member extends in the vertical direction from an underside of the elongate member, optionally providing the contact surface or the protrusion. This advantageously provides an arrangement in which the contact point is below the level of the stylus. The positioning of the contact point below the level of a stylus causes the horizontal drag force to produce a torque about a horizontal axis passing through the contact point (the pitch axis) and thereby to provide an increase in downforce at the distal end (or stylus end) of the elongate member, which helps to maintain contact of the stylus with the record (in use).

According to a second aspect, the invention provides a phonograph record player, comprising:

a base plate, comprising a turntable for a phonograph record;

a tonearm as described herein above, mounted to the base plate.

In some embodiments, the support member is attached to the turntable.

From a third aspect, the invention provides a tonearm comprising:

an elongate member;

a suspension means suspending the elongate member in an approximately horizontal position;

a protrusion; and a contact surface, wherein the protrusion is arranged in opposing contact with the contact surface at a contact point, such that application of a force parallel to the length of the elongate member is resisted by a contact force produced between the contact surface and the protrusion, wherein the contact force is substantially parallel to the length axis of the elongate member.

According to a fourth aspect, the invention provides a bearing for a tonearm, comprising a point pointing horizontally, pressing against a vertical thrust-plate surface which is approximately normal (perpendicular) to the direction of record movement at the stylus, or approximately perpendicular to the line from the stylus to the pivot-point.

The pivot-point is attached to a turntable, and the thrust-plate is attached to the tonearm, or the pivot-point is attached to the tonearm, and the thrust-plate is attached to the turntable. The horizontal pivot-point provides no vertical support so the tonearm is suspended by ligatures from a point directly above the pivot-point in a way which does not interfere with the correct movements of the pivot-point.

According to a fifth aspect, the invention provides a tonearm bearing comprising:

a pivot-point attached to a turntable;

a thrust-plate, attached to a tonearm, the thrust-plate surface being approximately normal (i.e. perpendicular) to the line from a stylus of the tonearm to a point on the thrust-plate where there is contact with the pivot-point; and a suspension arrangement, suspending the tonearm from a point directly above the pivot-point, attached to two points on the tonearm either side of the pivot-point, the two attachment points forming a straight line which bisects at or near the pivot-point.

According to a sixth aspect, the invention provides a tonearm bearing comprising:

a pivot-point attached to a tonearm;

a thrust-plate, attached to a turntable, the thrust-plate surface being approximately normal (perpendicular) to the line from a stylus of the tonearm to a point on the thrust-plate where there is contact with the pivot-point; and a suspension arrangement, suspending the tonearm from a point directly above the pivot-point, attached to two points on the tonearm either side of the pivot-point, the two attachment points forming a straight line which bisects at or near the pivot-point. According to a seventh aspect, the invention provides a method of constructing a tonearm, comprising:

arranging a suspension means to suspend an elongate member in an approximately horizontal position, such that the weight of the elongate member is substantially supported by the suspension means; and arranging a protrusion in opposing contact with a contact surface at a contact point, such that action of a drag force substantially parallel to the length of the elongate member urges the contact surface and the protrusion into opposing contact, thereby producing a contact force which resists the drag force.

According to an eighth aspect, the invention provides a method of constructing a phonograph turntable, comprising:

attaching a suspension means to a base plate;

arranging the suspension means to suspend an elongate member in an approximately horizontal position, such that the weight of the elongate member is substantially supported by the suspension means;

either:
  attaching a protrusion in connection with the base plate and attaching a contact surface in connection with the elongate member; or
  attaching the contact surface in connection with the base plate and attaching the protrusion in connection with the elongate member;
and
arranging the protrusion in opposing contact with the contact surface at a contact point, such that action of a drag force substantially parallel to the length of the elongate member urges the contact surface and the protrusion into opposing contact, thereby producing a contact force which resists the drag force.

According to a ninth aspect, there is provided a method of modifying a phonograph turntable, the phonograph turntable comprising a base plate and an elongate member, the method comprising:

attaching a suspension means to the base plate;

arranging the suspension means to suspend the elongate member in an approximately horizontal position, such that the weight of the elongate member is substantially supported by the suspension means;

either:
  attaching a protrusion in connection with the base plate and attaching a contact surface in connection with the elongate member; or
  attaching the contact surface in connection with the base plate and attaching the protrusion in connection with the elongate member;
and
arranging the protrusion in opposing contact with the contact surface at a contact point, such that action of a drag force substantially parallel to the length of the elongate member urges the contact surface and the protrusion into opposing contact, thereby producing a contact force which resists the drag force.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
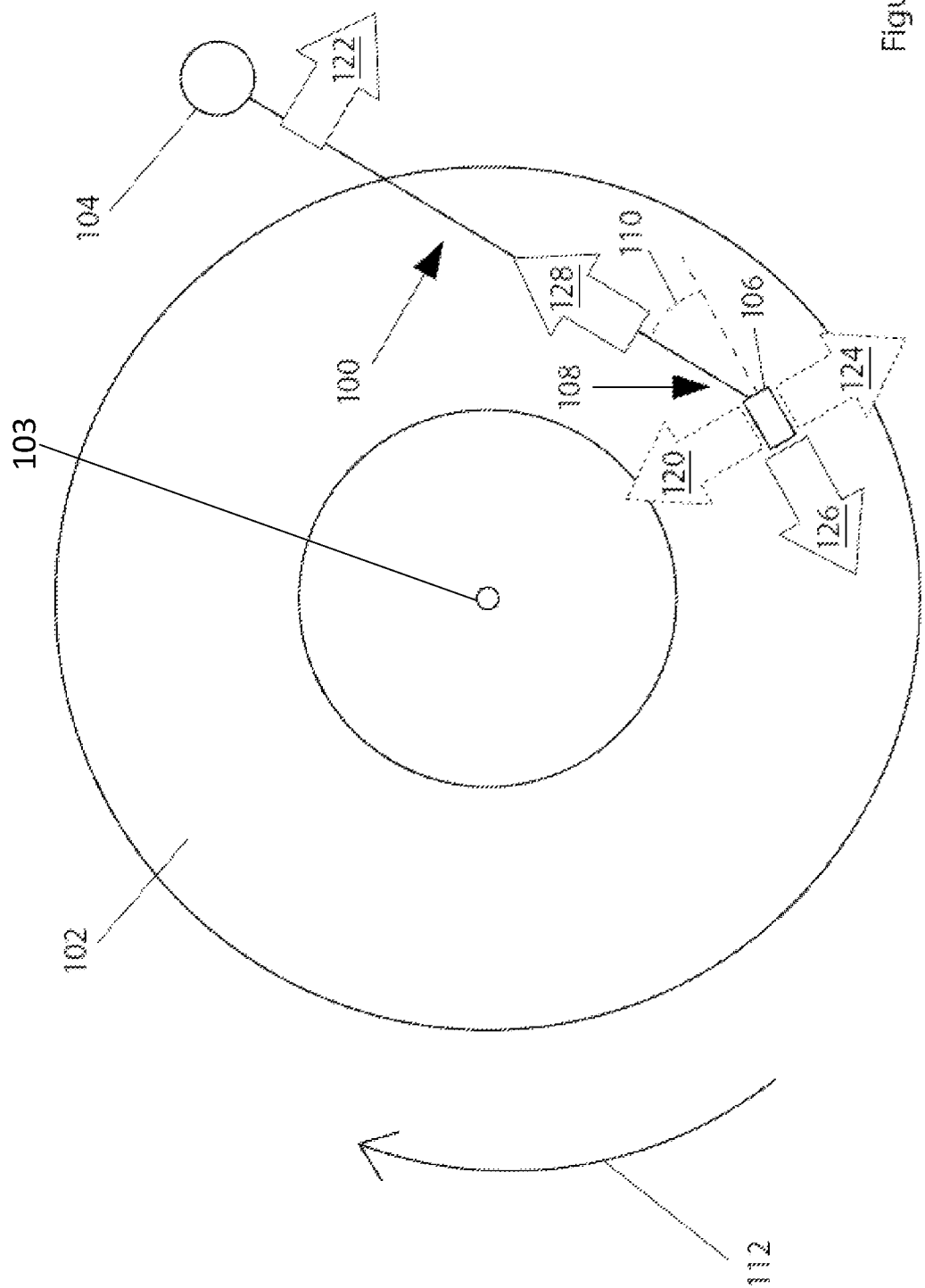
FIG. 1 is a schematic drawing showing a perspective view from above of a tonearm as is known in the art, illustrating the forces operating on the tonearm.

FIG. 1 shows a perspective view from above of a tonearm 100 as is known in the art, arranged above a phonograph record 102, illustrating the various forces acting on the tonearm 100. A first (proximal) end 104 of the tonearm 100 is connected to the turntable (not shown). A cartridge 106 is connected to a second (distal) end 108 of the tonearm 100. The cartridge 106 is arranged at an offset angle 110 relative to the length axis of the tonearm 100. Relative to the view shown in FIG. 1, the phonograph record 102 rotates in the clockwise direction, as represented by arrow 112, around its centre.

This offset angle 110 means that the drag force 126 due to rotational movement of the phonograph record 102 is not in line with the tension force 128 provided by the tonearm 100, such that the resultant 120 of these two forces 126, 128 pulls the stylus of the cartridge 106 sideways towards the centre of the record 103. This resultant force, known as "skate" force, is represented by arrow 120 (shown as a dotted arrow as it is a resolved force, rather than a real force). This skate force 120 encourages the arm to "skate" towards the centre of the record which is undesirable as it creates an imbalance in the forces provided on the stylus by the groove in the record 102 and therefore adds to the audible signature of the tonearm. An opposing force called anti-skate force 122 is therefore applied to the tonearm 100, typically at or near the first end 104 to balance this skate force 120. The effect of the anti-skate force 122 on the cartridge 106 is represented by arrow 124. This effect approximately balances the pressure on the left and right sides of the stylus, to prevent the tendency of the cartridge to "skate" towards the centre of the phonograph record 102.

Figure 2:
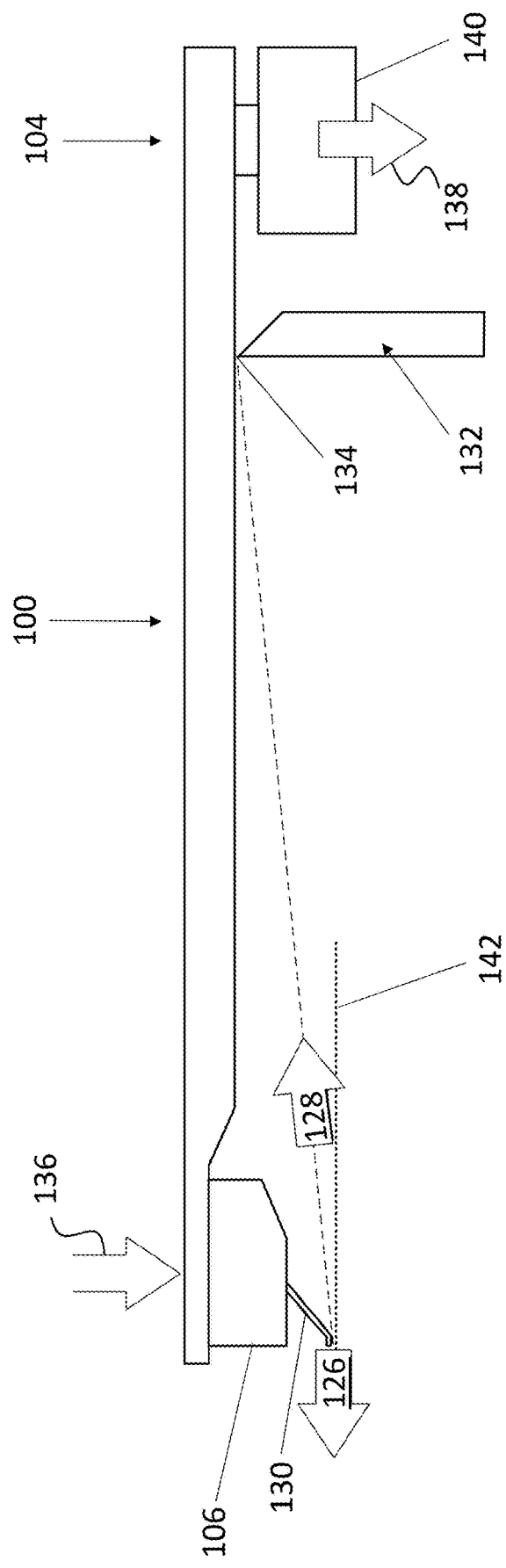
FIG. 2 is a schematic drawing showing a side view of a tonearm as is known in the art, illustrating further forces operating on the tonearm.

FIG. 2 shows a side view of a tonearm 100 as is known in the art, illustrating further forces operating on this tonearm 100. The stylus-cantilever structure including stylus 130 is seen extending from the cartridge 106. A pivot arrangement 132 provides the tension force 128. In the example as shown, the pivot point 134 of the pivot arrangement 132 is vertically higher than the surface of the phonograph record 102 (shown by the horizontal dotted line 142) on which the stylus 130 is positioned. As a result of this the tension force 128 includes a component of upwards force (i.e. in a direction away from the surface of the record 102 (not seen in FIG. 2) such that a surge in drag force 126, which results in an increased tension force 128 will result in an increased upwards force which might cause the stylus to lose contact with the groove of the phonograph record 102. The cartridge 106 provides a downward force 136 due to its weight, which partly counteracts any upward force arising as described above. This downward force 136 is carefully controlled by the counterweight force 138, produced by a counterweight 140 which is located at the first end 104 of the tonearm 100.

In addition to resisting these motions, the tonearm needs to allow movement in "pitch" and "yaw" directions. The "pitch" direction is rotation about a horizontal axis which is perpendicular to the length axis of the tonearm 100 i.e. it is the "up" and "down" motion created as a result of the stylus 130 going over a warp in a record 102. The "yaw" direction is rotation about a vertical axis passing through the tonearm i.e. the rotation required as the tonearm moves across the record, so as to play the record from first groove to last. Playing a standard 12 inch phonograph record with a 9 inch tonearm requires approximately 18° of "yaw" movement.

The present invention provides a tonearm which is particularly effective at resisting the resultant drag force arising from the pull of the record passing under the stylus and an applied anti-skate force, without introducing a detrimental audible signature when playing a record.

Five different embodiments are described below with reference to the Figures. Like reference numerals have been used for like components throughout the description, with suffixes "a", "b", "c", "d" and "e" referring respectively to the components of the first, second, third, fourth and fifth embodiments.

Figure 3:
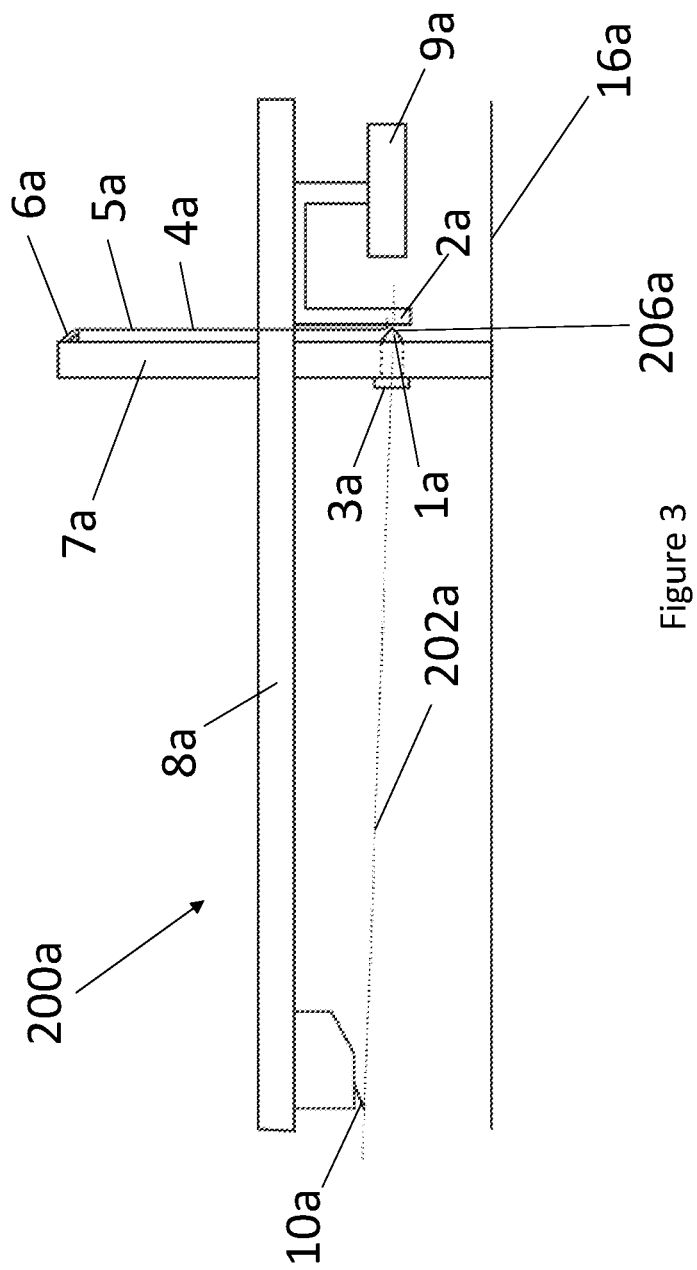
FIG. 3 is a side-view of a tonearm according to a first embodiment of the present invention.

FIG. 3 shows a first embodiment of a tonearm 200a according to the present invention. A protrusion 1a (which may also be referred to as a pivot-point) is attached to a support member 7a, which is in turn attached to base plate 16a of a record player. As seen in FIG. 3, the protrusion 1a points horizontally away from the stylus 10a of the tonearm 200a. A contact surface 2a, which in this case is provided by a thrust-plate, is rigidly attached to an elongate member 8a of tonearm 200a. In this example, the thrust plate 2a also provides a rigid connection member for connecting to suspension members 4a, 5a. The thrust-plate 2a and elongate member 8a are suspended from a support member 7a by suspension members 4a, 5a, which in this example are ligatures. The ligatures 4a, 5a meet and are attached at a point 6a which is directly vertically above the pivot-point 1a, both in the direction which is visible in the side view of FIG. 3, and also in the direction perpendicular to that direction i.e. "into the page" of FIG. 3.

The surface of the thrust-plate 2a, i.e. the contact surface, is approximately normal (perpendicular) to the line from the stylus 10a to the pivot-point 1a.

In use, a drag force is produced by a record, which passes under the stylus 10a, and tries to "drag" the stylus along with it (i.e. substantially to the left, with reference to FIG. 3). This drag force results in the contact surface of the thrust plate 2a being urged into contact with the protrusion 1a, at a contact point 206a. Since both the contact surface and the protrusion are rigid, this contact will produce a contact force (since once the surface and protrusion are in contact they cannot then be pushed any further together). The contact between the thrust plate 2a and the protrusion 1a produces a contact force in response to being acted on by the horizontal drag force. This contact force provides the tension that resists the drag force applied to the stylus 10a, and prevents movement of the elongate member 8a of the tonearm along the direction of the drag force. Thus the changing drag forces introduced by the record signal at the stylus 10a are not able to move the tonearm in the primary direction in which stylus drag tensions it (i.e. to the left in FIG. 3) due to the opposition of the essentially incompressible point 1a and thrust-plate 2a, at contact point 206a. The counter-weight 9a balances the tonearm so that appropriate tracking weight is maintained at the stylus 10a.

It will be seen that the line 202a through the tip of the stylus 10a and the contact point 206a, is in fact angled slightly "downwards" from the horizontal. Therefore the horizontal drag force at the stylus 10a and the horizontal reaction force at the contact point 206a are not collinear. As a result, increases in drag (for example due to a crescendo) produce a torque reaction about point 206a which will tend to increase down-force at the stylus 10a. This signal-derived reactive down-force will tend to reduce 'mistracking', i.e. the distortion produced when a stylus loses contact with the groove during high amplitude excursions.

As described above, the application of a drag force will urge the thrust plate 2a into contact with the protrusion 1a at contact point 206a. However it may be desirable that some light contact is maintained in the absence of this drag force. Thus, the tonearm 200a also includes a magnet 3a (which may form part of a magnetized pivot-point). The magnet 3a provides attraction between the protrusion 1a and thrust-plate 2a so that contact is maintained even if other forces, for example foot-fall vibrations, tend to separate them during playback of a record. It will be appreciated however that the magnet 3a is not always required.

Figure 4:
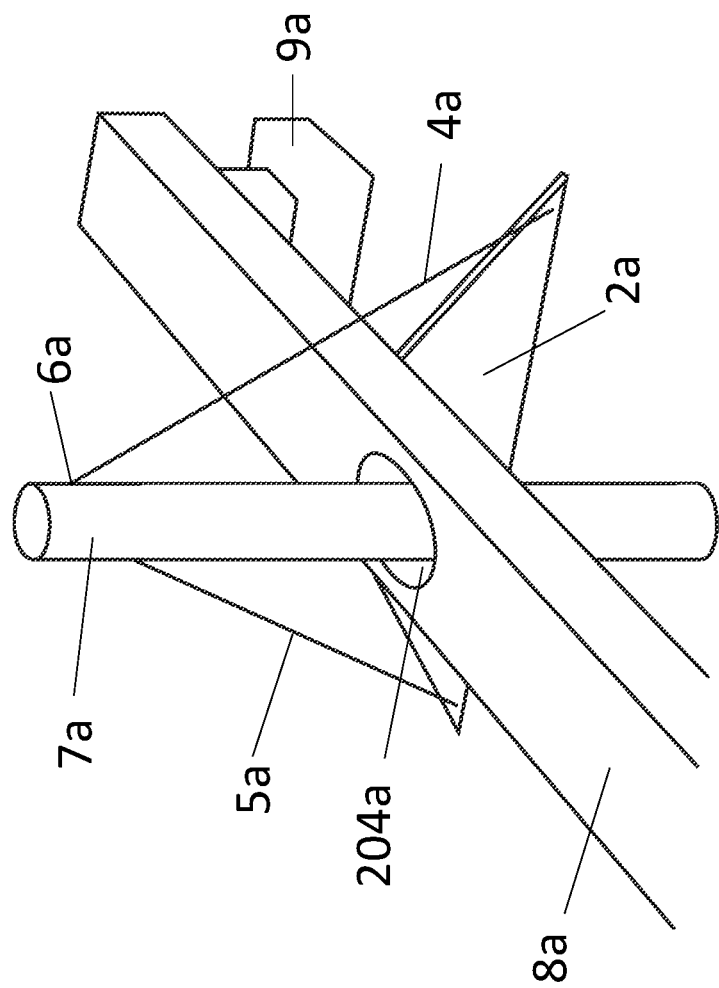
FIG. 4 is a perspective view showing part of the tonearm of FIG. 3.

The horizontal pivot-point 1a provides no vertical support to the elongate member 8a, which is supported by suspension members 4a, 5a, in connection with support member 7a. The arrangement of these components can be seen more clearly with reference to FIG. 4. As can be seen in FIG. 4, in this example the support member 7a is a vertical elongate member, which passes through a hole 204a in the elongate member 8a. These components are also seen more clearly in FIG. 5, in which the support member 7a and the elongate member 8a are omitted for clarity.

It can be seen that each suspension member 4a, 5a is connected at one end to the support member 7a, specifically to the same point 6a of the support member 7a. The other ends of the suspension members 4a, 5a are connected respectively to a first connection point 11a and a second connection point 12a on the thrust plate 2a. This forms an arrangement which could be referred to as a "ligature trapeze". Rotation of the elongate member 8a of the tonearm 200a as it moves across the record ('yaw') is allowed by rotation of the ligature trapeze at the suspension point 6a, around a vertical axis 14a, which passes through suspension point 6a and the contact point 206a, at which protrusion 1a contacts thrust plate 2a.

Thus in this example the thrust plate 2a provides both the contact surface in order to produce a contact force, and also provides a rigid connection member to which the suspension members 4a, 5a can be connected.

A nine inch tonearm (23 cm) needs to yaw by up to about ±9° either side of the perpendicular position to play a full length LP. Contact force at the pivot-point 1a against the thrust-plate 2a enables it to resist stylus drag forces even when the thrust-plate 2a is not perfectly perpendicular to the pivot-point axis, but is instead skew by 9° or more (about the axis 14a) at the beginning and end of a record. The pivot-point 1a and thrust-plate 2a therefore allow almost frictionless rotation in the vertical axis of rotation 14a (yaw) passing through the pivot-point without significant changes in arm height or balance, as is necessary for the stylus 10a to follow the groove towards the centre of a record.

Figure 5:
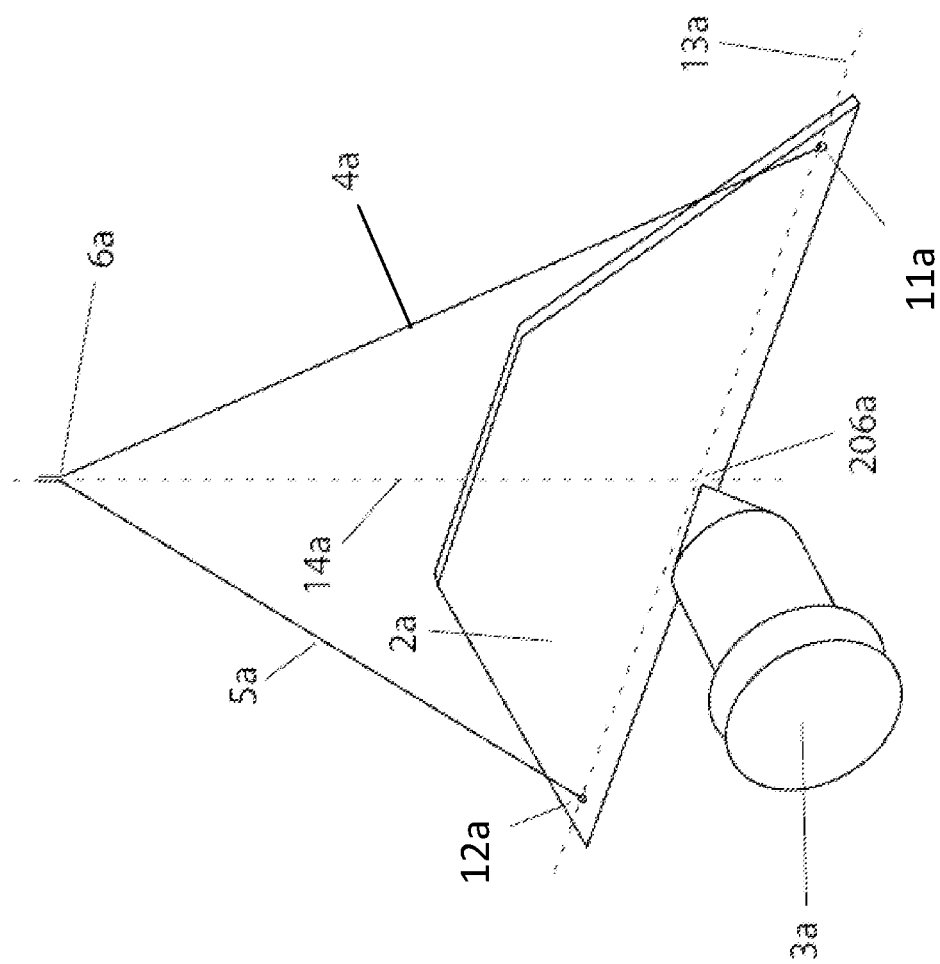
FIG. 5 shows the suspension member, rigid connection member and protrusion of the tonearm of FIGS. 3 and 4.

As shown in FIG. 5 the suspension members 4a, 5a are attached to the thrust plate 2a (which itself is connected to the elongate member 8a, as shown in FIG. 3) at two points 11a, 12a on either side of the contact point 206a, at which the protrusion 1a contacts the thrust plate 2a. The three points 11a, 12a, 206a all lie on a straight horizontal line 13a, as seen in FIG. 5. This horizontal line 13a forms the axis for 'pitch' rotation, as occurs when the stylus 10a needs to rise over a record warp.

The two suspension members 4a, 5a restrict the freedom of the elongate member 8a to rotate around its own longitudinal axis ('roll', also known as azimuth, an unwanted rotation which is a shortcoming of conventional vertical unipivot tonearms). This is due to the suspension point 6a being located away from the longitudinal axis of the elongate member 8a such that any roll would require horizontal swing which is resisted by the friction at contact point 206a. It may be noted that the tendency to roll is very small and therefore the corresponding frictional resistance required to prevent it is also very small.

Figure 6:
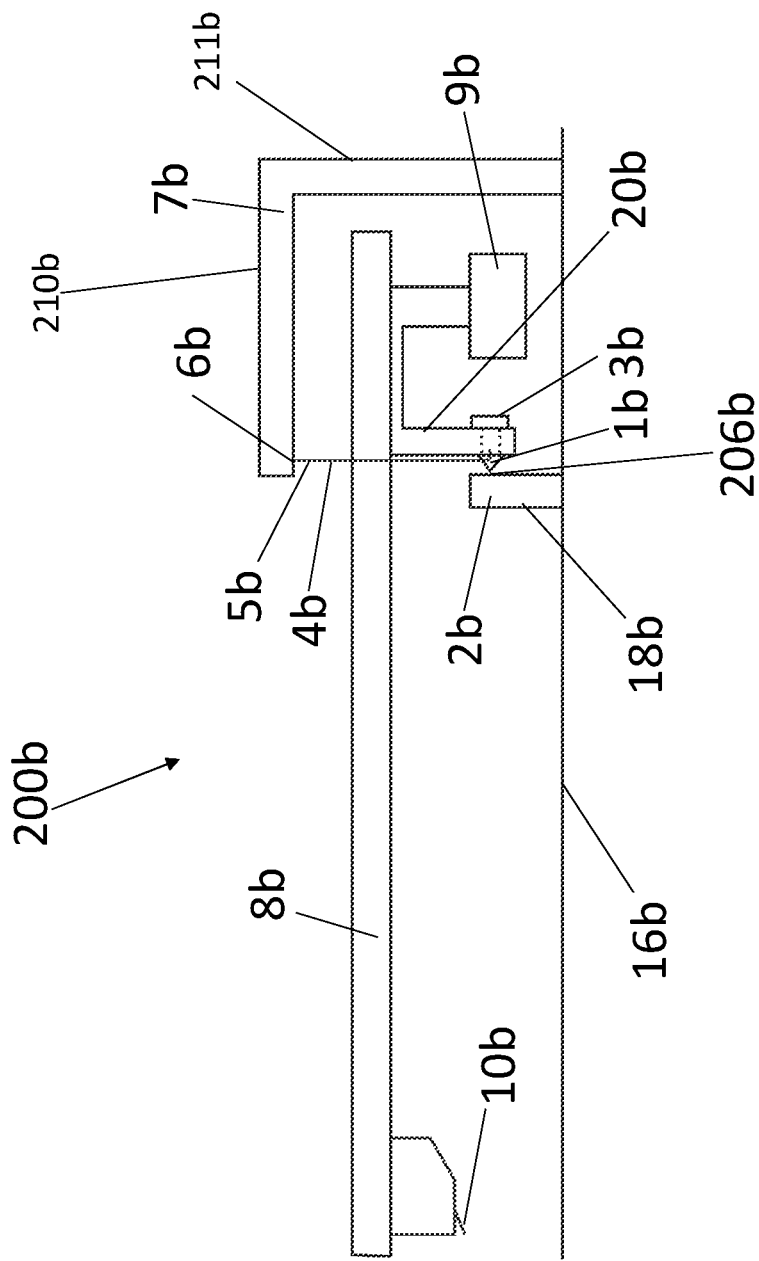
FIG. 6 is a side-view of a tonearm according to a second embodiment of the present invention.

FIG. 6 shows a second embodiment of a tonearm 200b according to the present invention. Like components have been labelled with the same reference numerals as FIGS. 3-5, with the suffix "b" indicating that they belong to the second embodiment. Components that are substantially similar to those described with reference to FIGS. 3-5 will not be described again with reference to the second and third embodiments, but rather only the differences will be described in detail.

Figure 7:
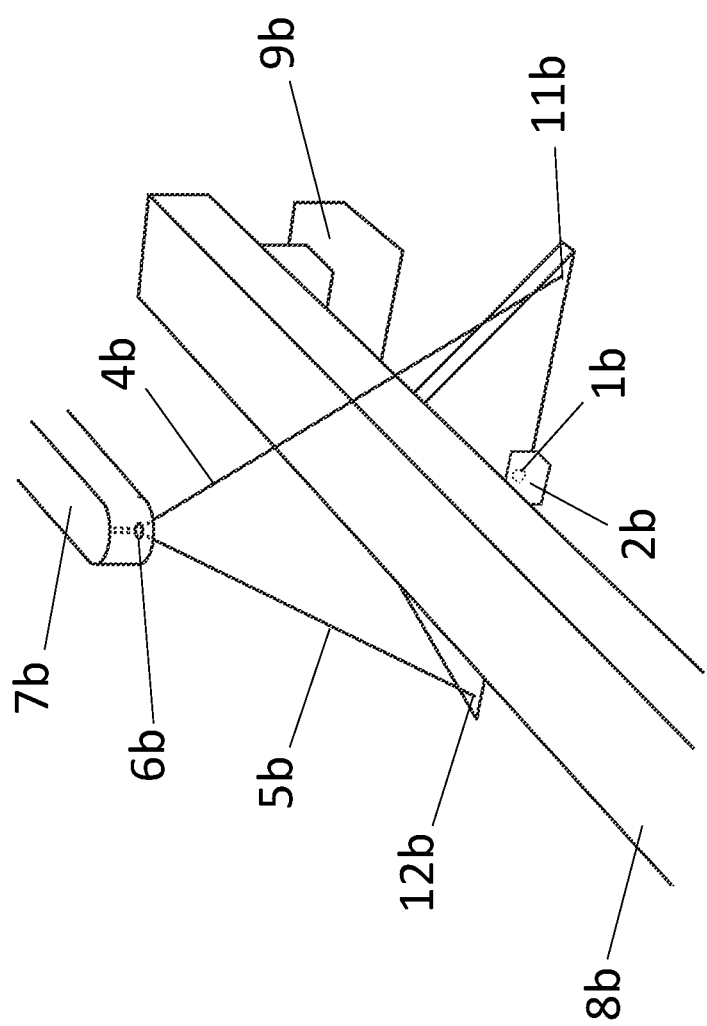
FIG. 7 is a perspective view showing part of the tonearm of FIG. 6.

In this second embodiment, rather than support member 7b extending through the elongate member 8b, support member 7b is rather an L-shaped support member, having a first arm 210b and a second arm 211b, attached together substantially at right angles, as seen in FIG. 6. The first arm 210b of the support member 7b extends substantially horizontally above the elongate member 8b, and the support members 4b, 5b are connected to a connection point 6b of the first arm 210b of the support member 7b, as shown in FIG. 7. The second arm 211b of the support member 7b extends substantially vertically, and connects to the first arm 210b at a right angle.

In this example, the contact surface 2b is provided by a separate contact surface structure 18b, mounted to the base plate 16b. A rigid connection member 20b extends from the underside of elongate member 8b (similar to the first embodiment, but now this rigid connection member 20b does not provide a contact surface). The rigid connection member 20b comprises the protrusion 1b (and an associated magnet 3b).

Figure 8:
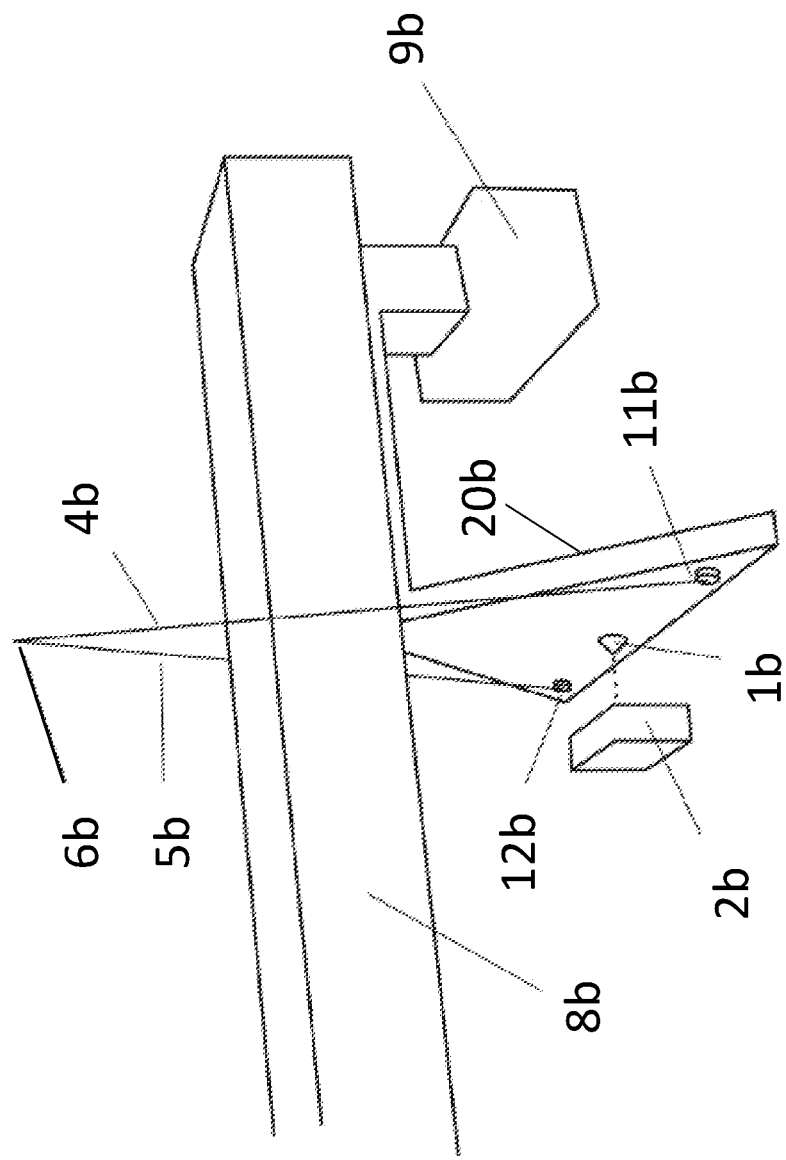
FIG. 8 is another perspective view showing part of the tonearm of FIG. 6, in which the protrusion and contact surface are visible.

FIG. 8 shows the contact surface 2b having been moved to the left (as indicated by the dashed line) for illustrative purposes so that the protrusion 1a (in this example formed as part of the rigid connection member 20b) can be seen. The first connection point 11b and the second connection point 12b, at which the suspension members 4b, 5b connect to the rigid connection member 20b can be seen in FIG. 9, as can the suspension point 6b.

Figure 9:
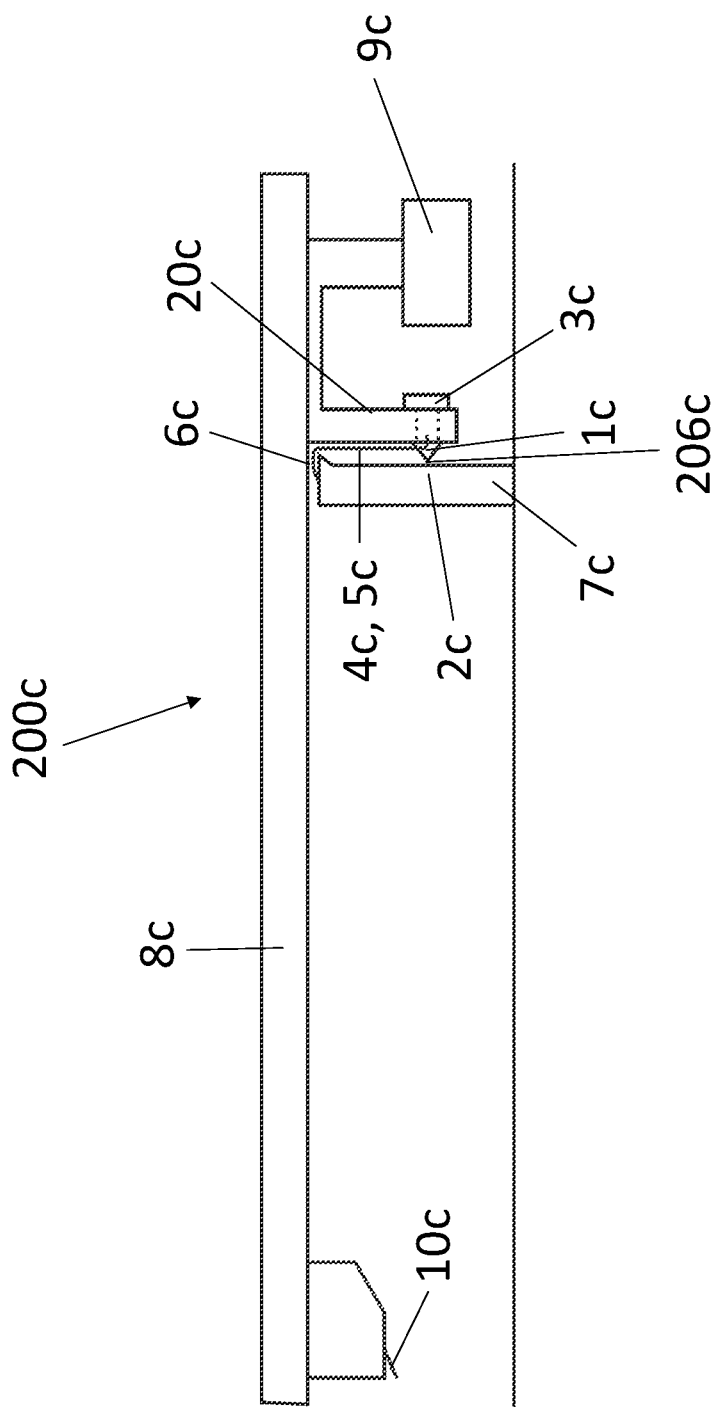
FIG. 9 is a side-view of a tonearm according to a third embodiment of the present invention.

FIG. 9 shows a tonearm 200c according to a third embodiment of the present invention. Once again the same reference numbers have been used for like components, but with the suffix "c", indicating they belong to the third embodiment. Only the differences from the previous embodiments will be described herein below. As in the second embodiment, the rigid connection member 20c comprises the protrusion 1c.

In this embodiment, the support member 7c comprises the contact surface 2c. The support member 7c is a vertical elongate member, arranged below the elongate member 8c, as shown in FIG. 9.

Figure 10:
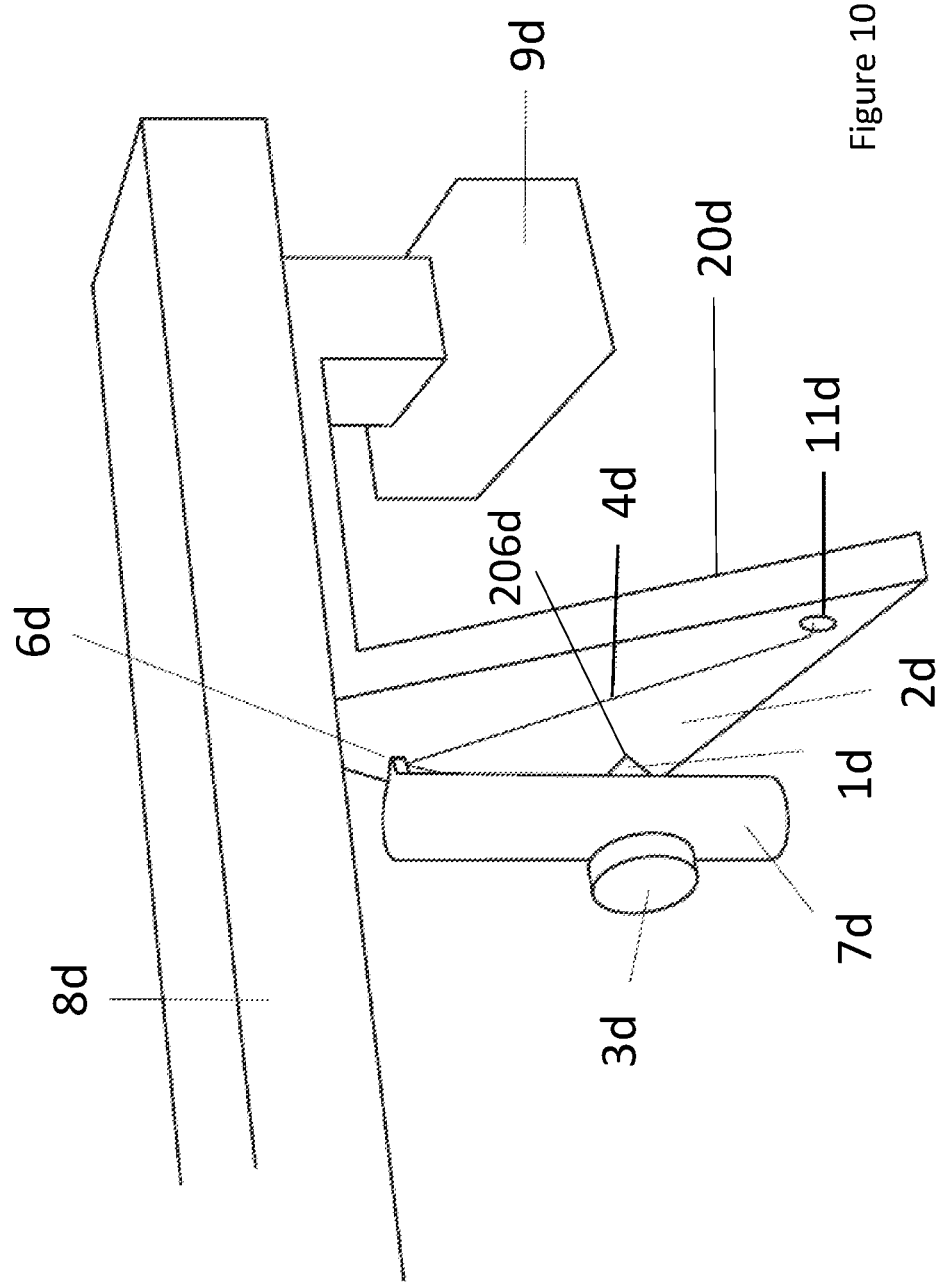
FIG. 10 is a perspective view showing part of a tonearm according to a fourth embodiment of the present invention, including the same support member arrangement as the tonearm of FIG. 9.

FIG. 10 shows a tonearm 200d according to a fourth embodiment of the present invention. Once again the same reference numbers have been used for like components, but with the suffix "d", indicating they belong to the fourth embodiment. Only the differences from the previous embodiments will be described herein below.

The support member 7d is the same as that shown in the third embodiment of FIG. 9. The only difference is that in the third embodiment, the protrusion 1c is part of the rigid connection member 20c, and the support member 7c provides the contact surface 2c. By contrast in the fourth embodiment the support member 7d comprises the protrusion 1d, and the rigid connection plate 20d provides the contact surface.

The arrangement of the suspension members 4c, 5c, 4d, 5d (which is the same for the third and fourth embodiments) is seen more clearly in FIG. 10. The suspension member 4c, 4d connects to the rigid connection member 20c, 20d at a first connection point 11c, 11d (and similarly the other suspension member 5c, 5d connects at a second connection point, but this is not visible). Each suspension member 4c, 5c, 4d, 5d connects to the support member 7c, 7d at a suspension point 6c, 6d, which is towards the top of the support member 7c, 7d, but is below the elongate member 8c, 8d.

As is seen in the side-view of FIG. 9 (and the perspective view of FIG. 10), the suspension point 6c, 6d at which the suspension members 4c, 5c, 4d, 5d are connected to the support member 7c,7d, is located very slightly further forwards, relative to the elongate member 8c, 8d (i.e. further towards the stylus 10c end of the elongate member 8c), than the first and second connection points 11c, 12c, 11d, 12d.

In the example of FIG. 9, this is achieved by having the protrusion 1c extend sufficiently far out from the rigid connection member 20c so as to push the rigid connection plate very slightly away from the support member 7c, very slightly tilting the angle of the suspension members 4c, 4d, 5c, 5d upwards and to the left (as viewed in FIG. 9) and producing consistent contact between the contact surface 2c, 2d and the protrusion 1c, 1d at the pivot point 206c, 206d.

In the example of FIG. 10, the protrusion 1d extends from the support member 7d, far enough to make consistent contact with the rigid support member 20d and push this slightly (towards the proximal end of the elongate member)

so that the connection points 11c, 11d (and 12c, 12d not shown) are slightly offset relative to the suspension point 6d to the support member 7d. Thus in this example, contact point 206d at which the protrusion 1d contacts the contact surface 2d is further towards the proximal end of the elongate member 8b (further to the right in FIG. 10) relative to the suspension point 6d. The connection points to the rigid connection member and the support member could be similarly offset along an axis parallel to the axis of the elongate member, in the first and second embodiments shown in FIGS. 3-8.

In each of these examples, the weight of the tonearm 8c, 8d and counter-weight 9c, 9d will then gently maintain contact between protrusion 1c, 1d and contact surface 2c, 2d while contributing only marginal rotational instability in the yaw axis.

Figure 11:
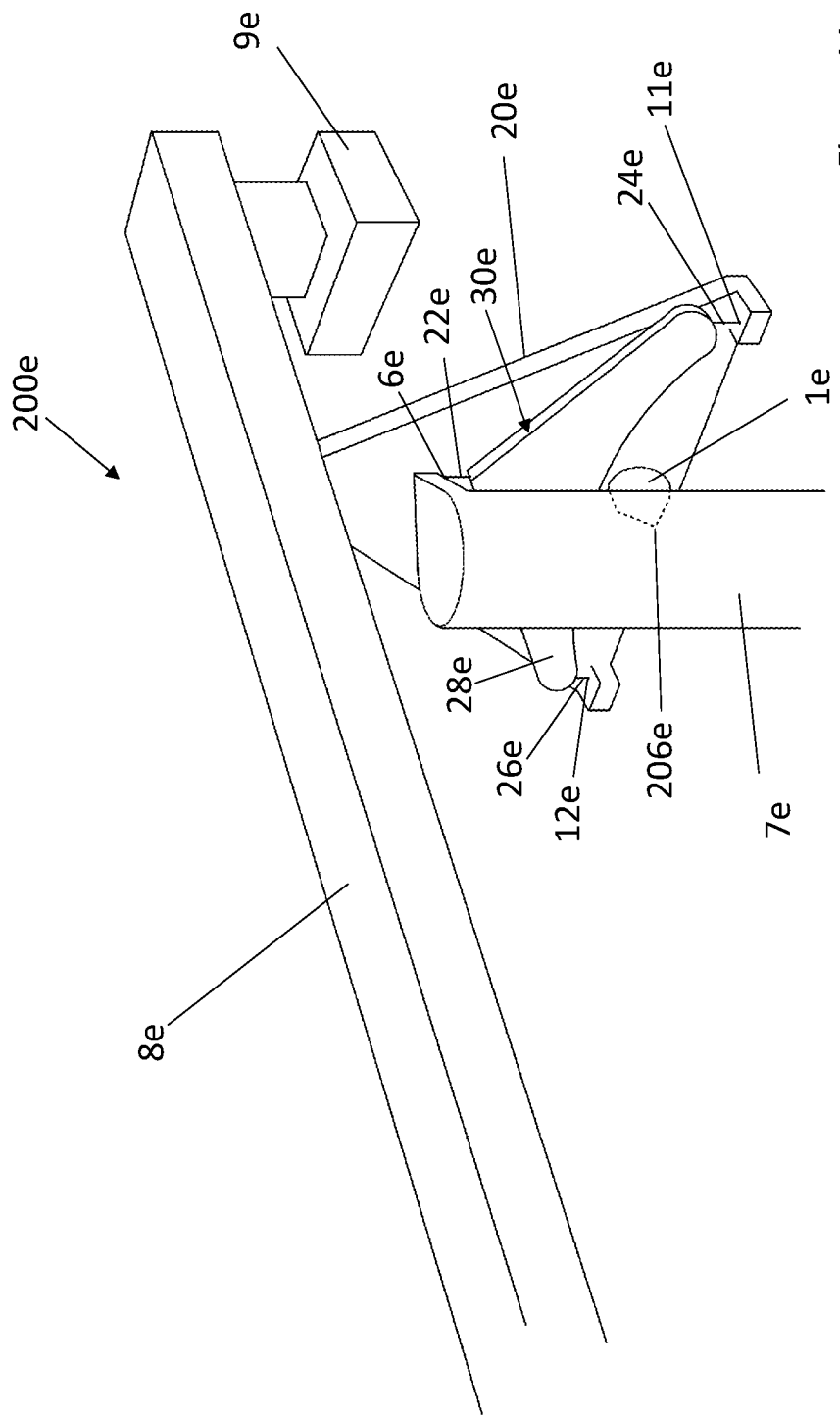
FIG. 11 is a perspective view showing part of a tonearm according to a fifth embodiment of the present invention.

FIG. 11 shows the proximal end of a tonearm 200e according to a fifth embodiment of the present invention. Once again the same reference numbers have been used for like components, but with the suffix "e", indicating they belong to the fifth embodiment. Only the differences from the previous embodiments will be described herein below.

The support member 7e is the same as that shown in the third embodiment of FIG. 9. This fifth embodiment differs from the fourth embodiment in that the protrusion 1e is part of the rigid connection member 20e, and the support member 7e provides the contact surface 2e (not visible in the figure). By contrast in the fourth embodiment, the support member 7d comprises the protrusion 1d, and the rigid connection plate 20d provides the contact surface 2d. In this respect the fifth embodiment is very similar to the third embodiment, of FIG. 9.

The fifth embodiment differs from the third embodiment in that instead of first and second suspension members 4c, 5c, the elongate member 8e is suspended by a rigid frame structure 30e with flexible attachments. Specifically, the rigid frame structure 30e includes a central rigid frame 28e. The central rigid frame 28e is connected to the support member 7e at suspension point 6e by a first flexible member 22e. The central rigid frame 28e is connected to the first connection point 11e of the rigid member 20e by a second flexible member 24e. The central rigid frame 28e is connected to the second connection point 12e of the rigid member 20e by a third flexible member 26e. The second and third flexible members 24e, 26e allow pivoting of the elongate member 8e (and rigid connection plate 20e) about the first and second connection points 11e, 12e so that the contact point 206e lies on this pivot axis (pitch axis). As seen in FIG. 11 the central rigid frame 28e is substantially triangular, but has a curved lower edge, creating a space through which the protrusion 1e can pass below the central rigid frame 28e so as to contact the contact surface of the support member 7e. It will be appreciated that other shapes are possible.

In summary, the geometry of the protrusion 1 and its supports 4, 5, 7 enables free and practically frictionless rotation in the two rotational axes, namely 'pitch' 13, necessary for the distal end of the elongate member (and therefore the stylus 10) to deflect upwards over warps, and 'yaw' 14, allowing the distal end of the elongate member (and therefore the stylus 10) to progress towards the centre of the record during playback, while opposing even microscopic movements in the direction of the major component of stylus drag, due to the gapless and largely inelastic contact between the protrusion 1 and the contact surface 2.

The invention described herein above thus has a number of advantages over known tonearm designs of the prior art. These are described throughout the description, and some are also given below:
- A sideways unipivot bearing provides zero-tolerance rigidity in the groove's time axis.
- The trapeze suspension constrains roll around the arm's longitudinal axis, unlike conventional vertical unipivot designs.
- The pivot-point and thrust-plate surface do not suffer from rattle/chatter due to wear, sloppy tolerances or thermal expansion as they form a single point of hard contact.
- The invention is stable enough to work effectively without the need for high precision parts.
- The pivot-point wears less than vertical unipivot bearings as it does not support the weight of the arm.
- The pivot-point is easily replaced.
- Replacement pivot-points can be cheaply produced, for example, a metal bolt with a sharpened end.
- The pivot-point can be below the stylus level so that increases in stylus drag produce a torque reaction which increases down-force on the stylus.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A tonearm comprising:
    an elongate member;
    a suspension means suspending the elongate member in an approximately horizontal position, wherein the weight of the elongate member is substantially supported by the suspension means from a point which is at a greater height than the height at which the suspension means is connected to the elongate member;
    a protrusion; and
    a contact surface wherein the contact surface is arranged substantially perpendicular to the length axis of the elongate member,
    wherein the protrusion is arranged in opposing contact with the contact surface at a contact point, such that action of a drag force substantially parallel to the length of the elongate member urges the contact surface and the protrusion into opposing contact, thereby producing a contact force which resists the drag force.

2. The tonearm of claim 1, wherein the contact surface is at an angle of at least 60° to the length axis of the elongate member.

3. The tonearm of claim 1, wherein the protrusion defines a protrusion axis, about which the protrusion is approximately rotationally symmetric, wherein the protrusion axis is substantially parallel to the length axis of the elongate member.

4. The tonearm of claim 1, wherein the contact surface is attached to the elongate member.

5. The tonearm of claim 1, wherein the contact surface is a substantially flat plate.

6. The tonearm of claim 1, wherein the protrusion and the contact surface are attracted to each other by a magnetic force.

7. The tonearm of claim 1, further comprising a rigid connection member, wherein the rigid connection member is attached to the elongate member, and wherein the suspension means comprises at least one suspension member, connected to the rigid connection member at a first connection point.

8. The tonearm of claim 7, wherein the rigid connection member provides the contact surface.

9. The tonearm of claim 7, wherein the rigid connection member comprises the protrusion.

10. The tonearm of claim 7, wherein the rigid connection member extends in the vertical direction from an underside of the elongate member.

11. The tonearm of claim 7, further comprising a support member, wherein the at least one suspension member is connected to the support member.

12. The tonearm of claim 11, wherein the support member is a substantially vertical elongate member.

13. The tonearm of claim 12, wherein the support member is arranged to pass through an opening in the elongate member, and wherein the at least one suspension member is connected to the support member at a point above the elongate member.

14. The tonearm of claim 12, wherein the at least one suspension member is connected to the support member at a point below the elongate member.

15. The tonearm of claim 11, wherein the support member is a substantially L-shaped member, comprising a first arm and a second arm attached together and approximately at right angles relative to each other, wherein the first arm is arranged substantially vertically, and wherein the second arm is arranged approximately horizontally, extending above the elongate arm, wherein the at least one suspension member is attached to the second arm.

16. The tonearm of claim 11, wherein the first connection point is offset along an axis parallel to the length of the elongate member, relative to a suspension point at which the at least one suspension member is connected to the support member, so as to urge the protrusion and the contact surface into opposing contact.

17. The tonearm of claim 11, wherein the at least one suspension member is a single suspension member, having a first end and a second end, wherein the first end is connected to the first connection point and wherein the second end is connected to a second connection point, and wherein the single suspension member is connected to the support member at a point along its length between the first end and the second end.

18. The tonearm of claim 17, wherein the single suspension member is connected to the support member at a point along the length of the single suspension member which is equidistant between first end and the second end of the single suspension member.

19. The tonearm of claim 11, wherein the at least one suspension member comprises a first suspension member extending between the first connection point on the rigid connection member and a suspension point on the support member and a second suspension member extending between a second connection point on the rigid connection member and the suspension point on the support member.

20. The tonearm of claim 7, wherein the first connection point is at approximately the same vertical height as the contact point.

21. The tonearm of claim 7, wherein the at least one suspension member is connected to the rigid connection member at the first connection point and at a second connection point.

22. The tonearm of claim 1 wherein the elongate member defines a proximal end and a distal end, wherein the tonearm further comprises:
   a cartridge comprising a stylus, connected to the distal end; and
   a counterweight connected to the proximal end.

23. A phonograph record player, comprising:
   a base plate, comprising a turntable for a phonograph record; and
   the tonearm of claim 1.

24. A method of constructing a tonearm, comprising:
   arranging a suspension means to suspend an elongate member in an approximately horizontal position, such that the weight of the elongate member is substantially supported by the suspension means from a point which is at a greater height than the height at which the suspension means is connected to the elongate member; and
   arranging a protrusion in opposing contact with a contact surface at a contact point, such that action of a drag force substantially parallel to the length of the elongate member urges the contact surface and the protrusion into opposing contact, thereby producing a contact force which resists the drag force, wherein the contact surface is arranged substantially perpendicular to the length axis of the elongate member.

25. A method of constructing a phonograph record player, comprising:
   attaching a suspension means to a base plate;
   arranging the suspension means to suspend an elongate member in an approximately horizontal position, such that the weight of the elongate member is substantially supported by the suspension means from a point which is at a greater height than the height at which the suspension means is connected to the elongate member;
   either:
      attaching a protrusion in connection with the base plate and attaching a contact surface in connection with the elongate member; or
      attaching the contact surface in connection with the base plate and attaching the protrusion in connection with the elongate member;
   arranging the protrusion in opposing contact with the contact surface at a contact point, such that action of a drag force substantially parallel to the length of the elongate member urges the contact surface and the protrusion into opposing contact, thereby producing a contact force which resists the drag force, wherein the contact surface is arranged substantially perpendicular to the length axis of the elongate member.

26. A method of modifying a phonograph record player, the phonograph record player comprising a base plate and an elongate member,
   the method comprising:
   attaching a suspension means to the base plate;
   arranging the suspension means to suspend the elongate member in an approximately horizontal position, such that the weight of the elongate member is substantially supported by the suspension means from a point which is at a greater height than the height at which the suspension means is connected to the elongate member;
   either:
      attaching a protrusion in connection with the base plate and attaching a contact surface in connection with the elongate member; or
      attaching the contact surface in connection with the base plate and attaching the protrusion in connection with the elongate member;
   arranging the protrusion in opposing contact with the contact surface at a contact point, such that action of a drag force substantially parallel to the length of the elongate member urges the contact surface and the protrusion into opposing contact, thereby producing a contact force which resists the drag force, wherein the contact surface is arranged substantially perpendicular to the length axis of the elongate member.

27. A tonearm comprising:
an elongate member;
a suspension means suspending the elongate member in an approximately horizontal position, wherein the weight of the elongate member is substantially supported by the suspension means;
a protrusion, wherein the protrusion defines a protrusion axis, about which the protrusion is approximately rotationally symmetric, wherein the protrusion axis is substantially parallel to the length axis of the elongate member; and
a contact surface wherein the contact surface is arranged substantially perpendicular to the length axis of the elongate member,
wherein the protrusion is arranged in opposing contact with the contact surface at a contact point, such that action of a drag force substantially parallel to the length of the elongate member urges the contact surface and the protrusion into opposing contact, thereby producing a contact force which resists the drag force.

28. A tonearm comprising:
an elongate member;
a suspension means suspending the elongate member in an approximately horizontal position, wherein the weight of the elongate member is substantially supported by the suspension means;
a protrusion; and
a contact surface wherein the contact surface is arranged substantially perpendicular to the length axis of the elongate member and wherein the contact surface is a substantially flat plate,
wherein the protrusion is arranged in opposing contact with the contact surface at a contact point, such that action of a drag force substantially parallel to the length of the elongate member urges the contact surface and the protrusion into opposing contact, thereby producing a contact force which resists the drag force.

29. A tonearm comprising:
an elongate member;
a suspension means suspending the elongate member in an approximately horizontal position, wherein the weight of the elongate member is substantially supported by the suspension means;
a protrusion; and
a contact surface wherein the contact surface is arranged substantially perpendicular to the length axis of the elongate member,
wherein the protrusion is arranged in opposing contact with the contact surface at a contact point, such that action of a drag force substantially parallel to the length of the elongate member urges the contact surface and the protrusion into opposing contact, thereby producing a contact force which resists the drag force; and
wherein the protrusion and the contact surface are attracted to each other by a magnetic force.

30. A tonearm comprising:
an elongate member;
a suspension means suspending the elongate member in an approximately horizontal position, wherein the weight of the elongate member is substantially supported by the suspension means;
a protrusion; and
a contact surface wherein the contact surface is arranged substantially perpendicular to the length axis of the elongate member,
a rigid connection member, wherein the rigid connection member is attached to the elongate member, and wherein the suspension means comprises at least one suspension member, connected to the rigid connection member at a first connection point; and
a support member, wherein the support member is a substantially vertical elongate member and wherein the at least one suspension member is connected to the support member;
wherein the protrusion is arranged in opposing contact with the contact surface at a contact point, such that action of a drag force substantially parallel to the length of the elongate member urges the contact surface and the protrusion into opposing contact, thereby producing a contact force which resists the drag force; and
wherein the at least one suspension member is connected to the support member at a point below the elongate member.

31. A tonearm comprising:
an elongate member;
a suspension means suspending the elongate member in an approximately horizontal position, wherein the weight of the elongate member is substantially supported by the suspension means;
a protrusion; and
a contact surface wherein the contact surface is arranged substantially perpendicular to the length axis of the elongate member,
a rigid connection member, wherein the rigid connection member is attached to the elongate member, and wherein the suspension means comprises at least one suspension member, connected to the rigid connection member at a first connection point; and
a support member, wherein the at least one suspension member is connected to the support member;
wherein the protrusion is arranged in opposing contact with the contact surface at a contact point, such that action of a drag force substantially parallel to the length of the elongate member urges the contact surface and the protrusion into opposing contact, thereby producing a contact force which resists the drag force; and
wherein the first connection point is offset along an axis parallel to the length of the elongate member, relative to a suspension point at which the at least one suspension member is connected to the support member, so as to urge the protrusion and the contact surface into opposing contact.

* * * * *